United States Patent [19]

Bonn et al.

[11] Patent Number: 5,139,436
[45] Date of Patent: Aug. 18, 1992

[54] ELECTRICAL CONNECTING ELEMENT FOR ROTATING PARTS

[75] Inventors: Helmut Bonn, Haibach; Gregor Zeller, Aschaffenburg, both of Fed. Rep. of Germany

[73] Assignee: Petri AG, Aschaffenburg, Fed. Rep. of Germany

[21] Appl. No.: 640,738

[22] Filed: Jan. 14, 1991

[30] Foreign Application Priority Data

Jan. 13, 1990 [EP] European Pat. Off. ............ 100666.8

[51] Int. Cl.$^5$ ............................................. H01R 35/00
[52] U.S. Cl. ......................................... 439/188; 439/15
[58] Field of Search ................... 439/15, 64, 188, 500, 439/509; 174/117 FF

[56] References Cited

U.S. PATENT DOCUMENTS

| | | | |
|---|---|---|---|
| 3,715,457 | 2/1973 | Teagno et al. | 174/117 FF X |
| 4,744,763 | 5/1988 | Suzuki et al. | 439/15 |
| 4,870,227 | 9/1989 | Saen et al. | 174/117 FF |
| 4,875,860 | 10/1989 | Suzuki | 439/15 |

*Primary Examiner*—Eugene F. Desmond
*Attorney, Agent, or Firm*—Robert J. Koch

[57] ABSTRACT

A connecting element establishes an electrical connection between two mutually rotating parts, such as the steering column and the steering wheel of an automotive vehicle. The connecting element includes a stator fastened to the steering column and a rotor fastened to a hub of the steering wheel. A current conductor in the form of a flat ribbon cable is carried on the rotor and passes through the walls of the rotor and the stator for the establishement of electrical contact between the power source and a power consuming device. The rotor and stator of the connecting element are combined in a cassette and each may be equipped with a multiple pole socket to receive a locking pin connector. Each locking pin connector has a predetermined number of poles corresponding at maximum to the number of poles of the multiple pole socket. A short circuit bridge is fastened to the housing of the stator. The multiple pole socket of the rotor is equipped with a receptacle for the connection of a short circuit bridge located on the generator cable. The connector pins may include the ends of the insulated conductor wires or may be reinforced by fitted contact pins. The ends of the conductor wires may be ground off and the flat ribbon cable fitted to a contact part containing connector pins.

12 Claims, 2 Drawing Sheets

ELECTRICAL CONNECTING ELEMENT FOR ROTATING PARTS

BACKGROUND OF THE INVENTION

1. Field of the Invention

The invention relates to a connecting element for establishing an electrical connection between two mutually rotating parts and more particularly to an electrical connecting element having a rotor, a stator and a current conductor.

2. Description of the Related Technology

Current transmission elements with a rotatable rotor connected to a steering wheel equipped with a fixed flat ribbon cable as the connecting line are known. These known current transmission elements are expensive to produce and therefore cost intensive. Known current transmission elements also have the additional significant disadvantage that it is not possible after assembly to adapt to different transmission conditions which are dependent on the number of poles required.

SUMMARY OF THE INVENTION

It is an object of the present invention to create a current transmission element which makes possible extensive standardization and adaptation to the transmission conditions required during the assembly. This object is attained with a current transmission element in the form of a cassette and including a rotor, a stator and a current conductor.

The manufacture of current transmission elements or electrical connecting elements may be standardized by providing a current transmission element in the form of a cassette including a rotor, a stator and a plurality of sockets for corresponding locking pin connectors. It is also necessary to provide multiple pole sockets. During the mounting operation in the automotive vehicle, the multiple pole socket may be connected to a two-pole or multiple-pole connecting cable depending on the type of vehicle. It is therefore possible to satisfy all of the requirements of vehicle manufacturers with a few standardized types of electrical connecting elements. According to the invention, the pin connector locks into the socket to provide a secure connection which prevents any unintentional disconnect. Greater scheduling freedom is also attained because the cable connections may be established by the manufacturer of the current transmission element or by the vehicle manufacturer.

DESCRIPTION OF THE PREFERRED EMBODIMENT

Figure 2:
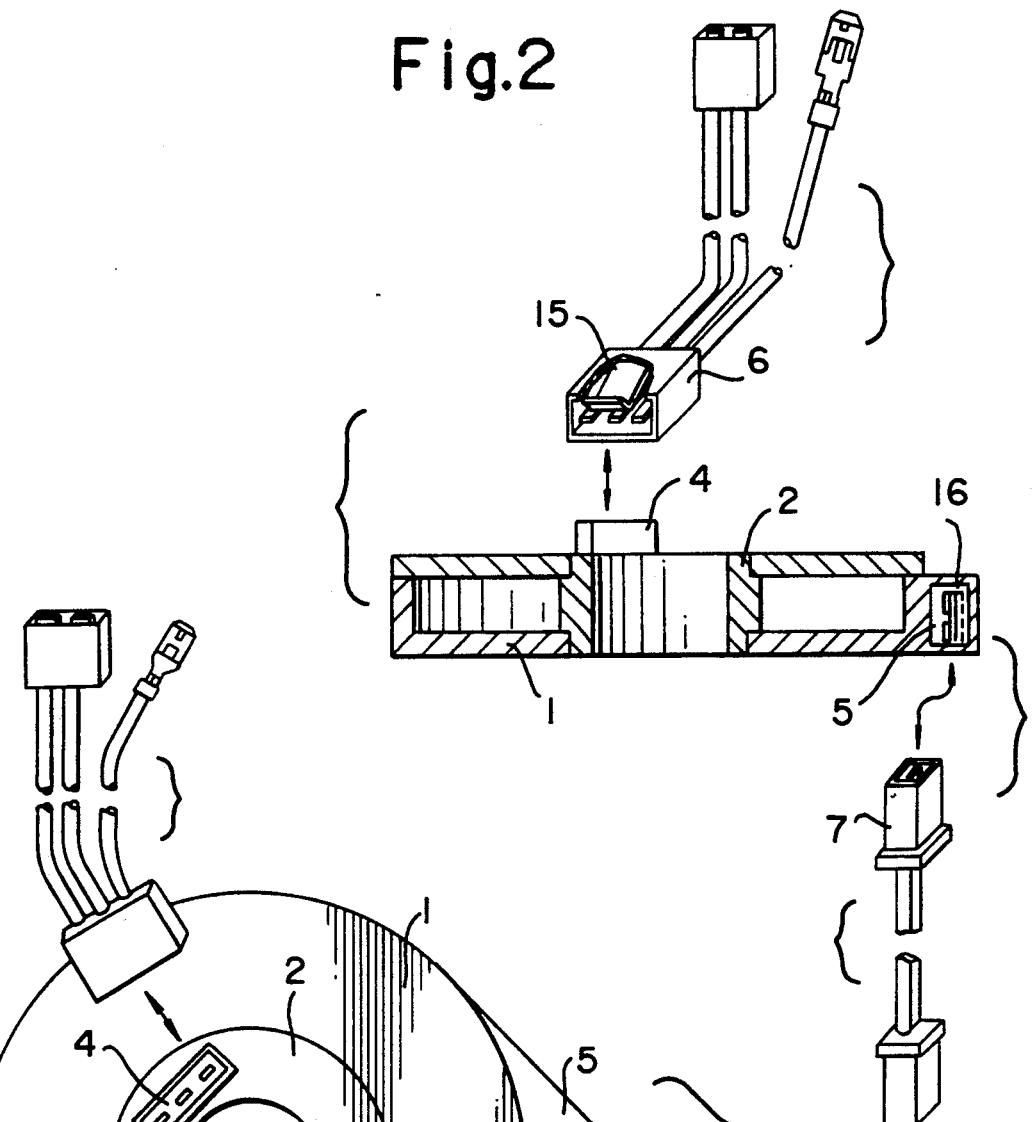
FIG. 2 shows a section through the current transmission element with the connecting cables shown in a perspective view.
Figure 1:
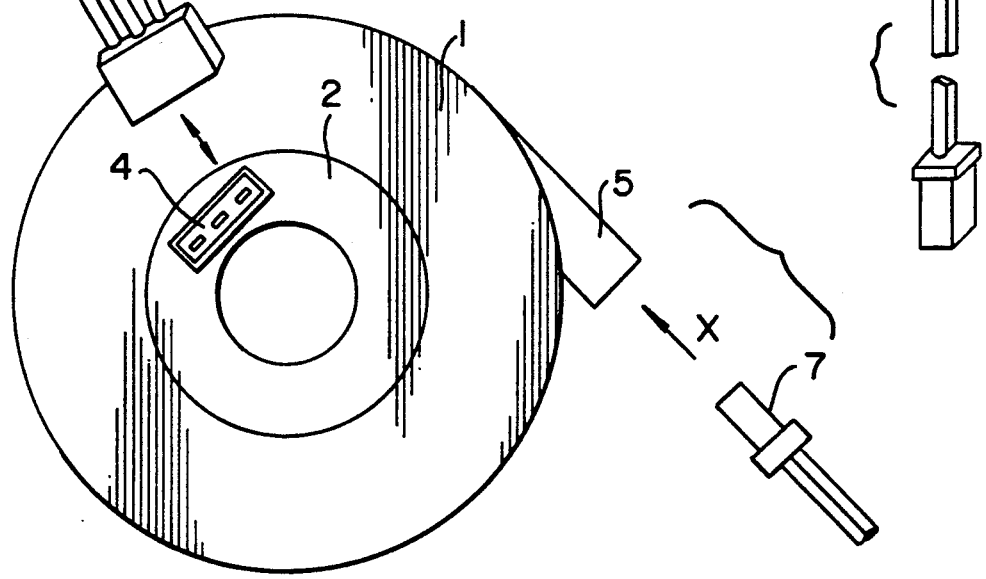
FIG. 1 shows a top view of a current transmission element with the connecting cables shown in a perspective view.

A connecting element is shown in the drawings for establishinng an electrical connection between two mutually rotatable parts, preferably, between the steering column and the steering wheel of an automotive vehicle. The connecting element includes a stator 1 which may be fastened to the steering column and a rotor 2 which may be fastened to the hub of the steering wheel. A current conductor 3, preferably a flat ribbon cable, is carried on the rotor and may establish an electrical connection between a power source and a power consuming device. The current conductor passes through the walls of rotor 2 and stator 1. Stator 1 and rotor 2 of the connecting element are rotatably combined into a cassette. Each of stator 1 and rotor 2 is equipped with a multiple pole socket 5, 4 respectively, to receive a corresponding locking pin connector 7,6 with a maximum number of poles corresponding to the number of poles of the corresponding multiple-pole socket 5,4 respectively. A short circuit bridge 16 is fastened to the housing of stator 1, while socket 4 of rotor 2 is equipped with a receptacle to connect a short circuit bridge 15 located on the generator cable 20.

Figure 3:
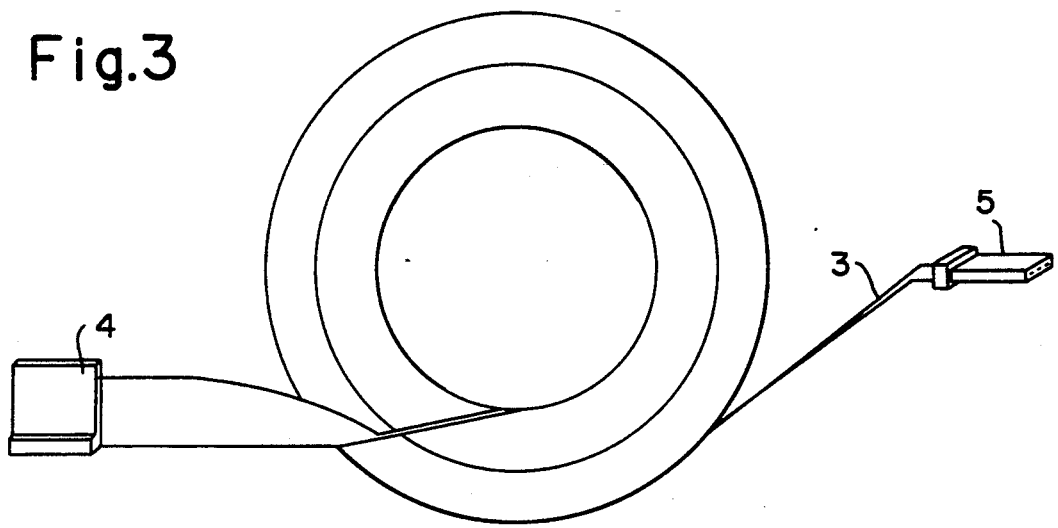
FIG. 3 shows a flat ribbon cable with multiple pole sockets in lieu of pin connectors.

FIG. 3 shows an embodiment of cable connector 3 having multiple pole sockets 4,5 located at either end, respectively.

Figure 4:
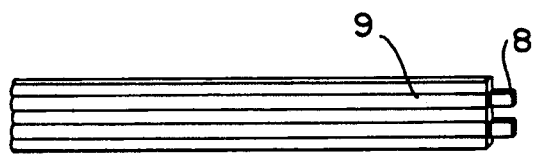
FIG. 4 shows a second embodiment of a flat ribbon cable equipped with pin connectors.
Figure 5:
FIG. 5 shows a third embodiment of a flat ribbon cable equipped with pin connectors.
Figure 6:
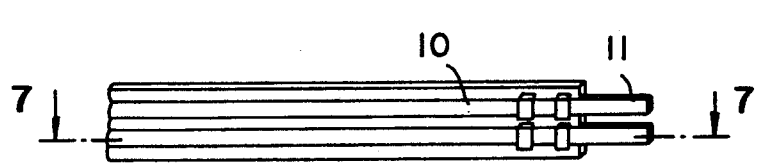
FIG. 6 shows a fourth embodiment of a flat ribbon cable equipped with pin connectors.
Figure 7:
FIG. 7 shows a section through the flat ribbon cable of FIG. 6 taken along line A—A.

FIG. 4 shows another embodiment of the invention in which the pin connectors of the flat ribbon cable are the exposed ends 8 of the insulated conductor wires 9. In the embodiment of the flat ribbon cable shown in FIG. 5, the exposed ends of the insulated conductor wires 12 may be ground off and a contact part 14 containing pin connectors 13 applied to the flat ribbon cable. In the embodiment of the invention shown in FIGS. 6 and 7, the conductor wires 10 may be, if necessary, reinforced with contact pins 11. Locking the pin connectors in the sockets assures a secure and nonreleasable connection.

The above explanation of the invention has been according to the example of a simple current transmission element having a two-pole connection. However, particular advantages may be obtained by using current transmission elements having multiple pole connections. In essence, the primary advantage of the current transmission element according to the invention resides in the fact that the invention may be produced in a configuration independent of the type of vehicle concerned. Further, the current transmission element may be subsequently modified by the insertion of the corresponding outlets by either the current transmission element manufacturer or the vehicle manufacturer, depending on the requirements of the particular type of vehicle.

We claim:

1. A connecting element establishing an electrical connection between two mutually rotating parts, in particular between a steering column and a steering wheel of an automotive vehicle, comprising:

a stator part fastened to the steering column;

a rotor part fastened to a hub of the steering wheel;

a flat ribbon cable current conductor carried on said rotor part and passing through walls of said rotor part and said stator part; and at least one short circuit bridge releasably connected to said cable current conductor;

wherein said stator part and said rotor part are combined in a cassette displaying a multiple pole socket configured to receive a locking pin connector.

2. A connecting element according to claim 1, wherein said short circuit bridge is fastened to a housing of the stator part and a socket of the rotor part is equipped with a short-circuit-bridge receiving receptacle.

3. A connecting element according to claim 1, wherein said current conductor exhibits pin connectors and conductor wires, and said pin connectors are ends of said conductor wires.

4. A connecting element according to claim 3, wherein said conductor wires are reinforced by fitted contact pins.

5. A connecting element according to claim 3, further comprising a contact part exhibiting pin connectors fitted to said flat ribbon cable current conductor.

6. A connecting element according to claim 1, wherein one of said stator part and said rotor part exhibits a socket located in a radial plane of said cassette and the other of said stator part and said rotor part exhibits a socket located parallel to an axial direction of said cassette.

7. A connecting element according to claim 1, wherein said short circuit bridge is located in a bushing of said stator part and is configured to be opened by insertion of the pin connector.

8. A connecting element comprising:
   a stator fastened to a first mutually rotating part and exhibiting a short circuit bridge;
   a rotor fastened to a second mutually rotating part; and
   a current conductor carried on said rotor and passing through the walls of said rotor and said stator, said stator and said rotor are combined in a cassette displaying a multiple pole socket configured to receive a corresponding locking pin connector.

9. A connecting element according to claim 8, wherein said current conductor further comprises insulated conductor wires and pin connectors, said pin connectors including the exposed ends of said insulated conductor wires.

10. A connecting element according to claim 8, wherein said current conductor further comprises conductor wires, said conductor wires including fitted contact pins.

11. A connecting element according to claim 8, further comprising:
   a contact part having pin connectors, wherein said current conductor further comprises insulated conductor wires surrounded by insulation, the ends of said insulated conductor wires are substantially flush with the insulation and said contact part contacting said insulated conductor wires.

12. A connecting element according to claim 8, wherein said stator further comprises a tangentially directed socket and said rotor further comprises an axially directed socket, each of said sockets is selectively connectable to a connecting cable.

* * * * *